United States Patent
Halevi et al.

(10) Patent No.: US 8,121,286 B2
(45) Date of Patent: Feb. 21, 2012

(54) HASH FUNCTION WITH PROVABLE RESISTANCE TO DIFFERENTIAL ATTACKS

(75) Inventors: Shai Halevi, Elmsford, NY (US);
William Eric Hall, Clinton, CT (US);
Charanjit S. Jutla, New York, NY (US)

(73) Assignee: International Buisness Machines Corporation, Armonk, NY (US)

( * ) Notice: Subject to any disclaimer, the term of this patent is extended or adjusted under 35 U.S.C. 154(b) by 589 days.

(21) Appl. No.: 12/259,588

(22) Filed: Oct. 28, 2008

(65) Prior Publication Data

US 2010/0104095 A1    Apr. 29, 2010

(51) Int. Cl.
*H04K 1/00* (2006.01)
*G06F 11/30* (2006.01)

(52) U.S. Cl. .......... 380/29; 713/189; 713/190; 713/191; 713/192; 713/194; 380/28

(58) Field of Classification Search ...................... 380/29
See application file for complete search history.

(56) References Cited

U.S. PATENT DOCUMENTS

2004/0202318 A1*  10/2004  Lu .................................. 380/29

OTHER PUBLICATIONS

"Grindahl—a family of hash functions", Lars R. Knudsen et al., Proceeding Fast Software Encription 2007, 17 pgs.
"Finding Collisions in the Full SHA-1", Xiaoynn Wang et al., Proc. Crypto 2006, 20 pgs.

* cited by examiner

*Primary Examiner* — Longbit Chai
(74) *Attorney, Agent, or Firm* — Harrington & Smith (57) ABSTRACT

A system and method for coding data to help resist differential attacks. Data in m columns may be initialized to an initialized value. One new column of data may be mixed with a new input word and input to an advanced mixer. The advanced mixer may include linear mixing having indexed bytes and performing of exclusive-OR operation and transposing. An output of the advanced mixer may be a new m column state. A value of m could be 0 through 30. The value of m may have a preferred range of 27 through 36. Systems to implement the foregoing method are also described.

25 Claims, 8 Drawing Sheets

HASH FUNCTION WITH PROVABLE RESISTANCE TO DIFFERENTIAL ATTACKS

BACKGROUND

1. Field

The present invention relates to an efficient data processing and more specifically to generating a coding scheme resistant to differential attacks.

2. Description of Related Art

Typically, there are three main aspects of a cryptographic system. One aspect is to encrypt data using a secret key, another aspect is to digitally sign the data using a secret key, and the third aspect is to obtain a cryptographic fingerprint or a cryptographic hash. The cryptographic hash is used to digitally sign large files, by first obtaining a small fingerprint and then signing the small fingerprint using a secret key.

Methods to encrypt data using a secret key exist and are commonly called block ciphers, as these block ciphers encrypt data by dividing them into blocks of data, and processing a block at a time, with a feedback of some sort. The methods to sign data are called authentication schemes, or public key signature schemes, depending on whether a signature is required to have a property verifiable by a public party. The methods to obtain a fingerprint or cryptographic hash are called cryptographic hash functions, or just hash functions.

Typical cryptographic primitives use error-correcting codes to serve as linear mixers. Most error-correcting codes are linear mixers, and tend to have mixing properties desired in cryptographic primitives. Generally, two messages which have the same hash value are called a colliding pair. An existing method for finding colliding pairs is called differential cryptanalysis wherein an approximation of a difference propagation by linear functions has a minuscule probability.

BRIEF SUMMARY

Embodiments of the present disclosure provide a system and method for coding data to help resist a differential attack. The present disclosure teaches how to make a data coding system to help resist a differential attack.

Briefly described, in architecture, one embodiment of the system, among others, can be implemented as follows.

The data coding system may include a segmenting device configured to segment a first plurality of bits into a plurality of bytes, the plurality of bytes being a first byte, a second byte, continuing through an nth byte arranged at least in one of a column and a row, a processor configured to generate a plurality of initialized bytes arranged at least in one of a column and a row, a mixer configured to mix a first byte of the plurality of initialized bytes with the first byte of the plurality of bytes to generate a first output byte, mixing a second byte of the plurality of initialized bytes with the second byte of the plurality of bytes to generate a second output byte, continuing through iteratively to mix an nth byte of the plurality of initialized bytes with the nth byte of the plurality of bytes to generate an nth output byte, the output bytes arranged at least in one of a column and a row, a generating device configured to generate a plurality of mixed bytes, the plurality of mixed bytes being a first mixed byte, a second mixed byte, continuing through an nth mixed byte such that for a first predetermined number of one or more non-zero columns of the plurality of mixed bytes, and for a second predetermined number of one or more zero columns of the plurality of mixed bytes, wherein the first and second predetermined number of one or more non-zero columns have a respective mixed byte of the plurality of mixed bytes, one or more columns, having one or more of a respective output byte of the output bytes, are non-zero, and an output device configured to output a first predetermined set of a plurality of the first mixed byte, the second mixed byte, continuing through the nth mixed byte, the first predetermined set arranged at least in one of a column and a row.

The present disclosure can also be viewed as providing a method for data coding. The method may include segmenting a first plurality of bits into a plurality of bytes, the plurality of bytes being a first byte, a second byte, continuing through an nth byte arranged at least in one of a column and a row, generating a plurality of initialized bytes arranged at least in one of a column and a row, mixing a first byte of the plurality of initialized bytes with the first byte of the plurality of bytes to generate a first output byte, mixing a second byte of the plurality of initialized bytes with the second byte of the plurality of bytes to generate a second output byte, continuing through iteratively to mix an nth byte of the plurality of initialized bytes with the nth byte of the plurality of bytes to generate an nth output byte, the output bytes arranged at least in one of a column and a row, generating a plurality of mixed bytes, the plurality of mixed bytes being a first mixed byte, a second mixed byte, continuing through an nth mixed byte such that for a first predetermined number of one or more non-zero columns of the plurality of mixed bytes, and for a second predetermined number of one or more zero columns of the plurality of mixed bytes, wherein the first and second predetermined number of one or more non-zero columns have a respective mixed byte of the plurality of mixed bytes, one or more columns, having one or more of a respective output byte of the output bytes, are non-zero.

Other systems, methods, features, and advantages of the present invention will be, or will become apparent, to a person having ordinary skill in the art upon examination of the following drawings and detailed description. It is intended that all such additional systems, methods, features, and advantages included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. Components in the drawings are not necessarily to scale, emphasis instead being placed upon clearly illustrating principles of the present invention.

DETAILED DESCRIPTION

The present disclosure relates to a system and method for coding data to help resist a differential attack.

Figure 1:
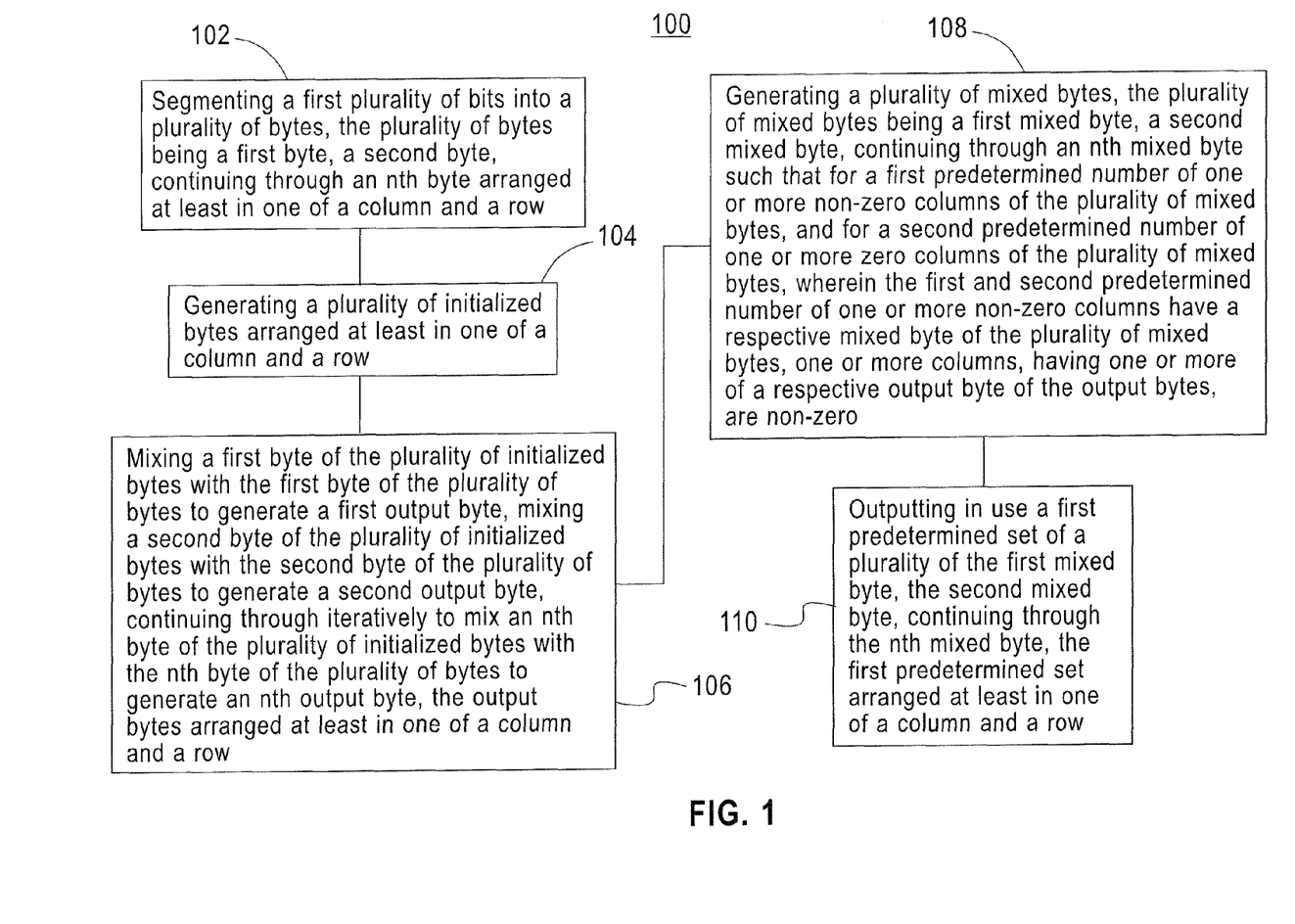
FIG. 1 is an embodiment of a method of the present disclosure.

FIG. 1 is a flowchart of an embodiment of a 100 method of the present disclosure. The method 100 may include segmenting a first plurality of bits into a plurality of bytes, the plurality of bytes being a first byte, a second byte, continuing through an nth byte arranged at least in one of a column and a row (block 102), generating a plurality of initialized bytes arranged at least in one of a column and a row (block 104), mixing a first byte of the plurality of initialized bytes with the first byte of the plurality of bytes to generate a first output byte, mixing a second byte of the plurality of initialized bytes with the second byte of the plurality of bytes to generate a second output byte, continuing through iteratively to mix an nth byte of the plurality of initialized bytes with the nth byte of the plurality of bytes to generate an nth output byte, the output bytes arranged at least in one of a column and a row (block 106), generating a plurality of mixed bytes, the plurality of mixed bytes being a first mixed byte, a second mixed byte, continuing through an nth mixed byte such that for a first predetermined number of one or more non-zero columns of the plurality of mixed bytes, and for a second predetermined number of one or more zero columns of the plurality of mixed bytes, wherein the first and second predetermined number of one or more non-zero columns have a respective mixed byte of the plurality of mixed bytes, one or more columns, having one or more of a respective output byte of the output bytes, are non-zero (block 108), and outputting in use a first predetermined set of a plurality of the first mixed byte, the second mixed byte, continuing through the nth mixed byte, the first predetermined set arranged at least in one of a column and a row (block 110).

In an embodiment of the method 100, only a left-most column of the plurality of mixed bytes may be non-zero. In another embodiment of the method 100, one or more columns, in addition to the left most column, may be non-zero. It should be noted that "non-zero" may mean a byte to be having some non-zero bits. It should be noted that "non-zero" may mean a column to be having some non-zero bytes possibly having a combination of 1s and 0s.

Figure 2:
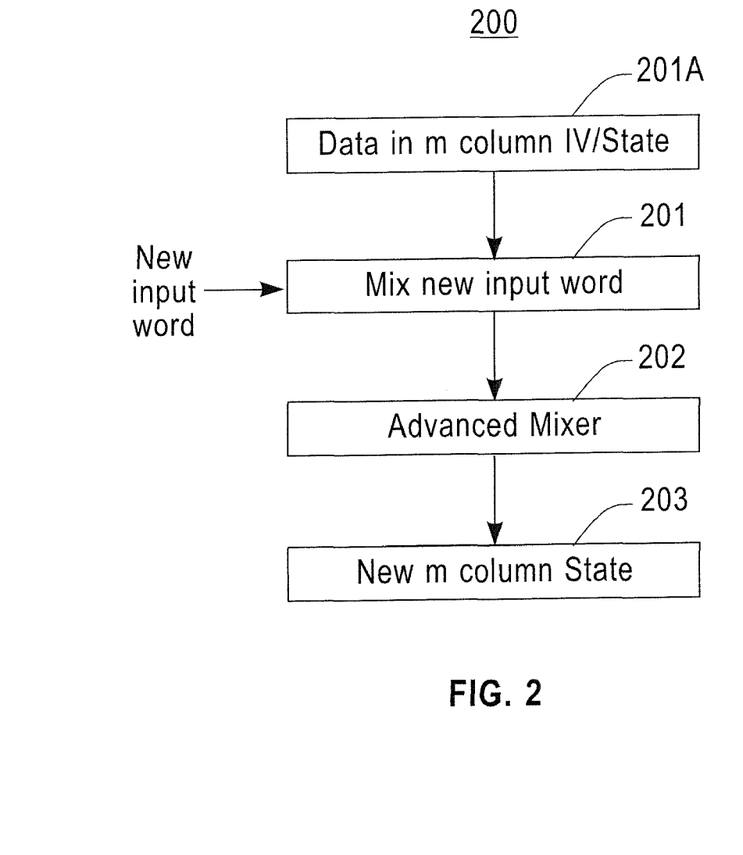
FIG. 2 illustrates another embodiment of a method of the present disclosure.

FIG. 2 illustrates another embodiment of a method 200 of the present disclosure. Data in m columns may be initialized to an initialized value (IV) (block 201A). Alternatively, the data in m columns may be termed as in m column state. A column may be a byte, or a word having more than one byte, as would be appreciated by a person skilled in the art. One new column of data may be mixed with a new input word (block 201) and input to an advanced mixer (block 202). An output of the advanced mixer may be a new m column state (block 203). A value of m could be 0 through 30. The value of m may have a preferred range of 27 through 36.

The segmenting the first plurality of bits in block 102 of the method 100 may be similar to generating the new input word, such as from a stream of raw input bits, shown in FIG. 2, block 201. The generating the plurality of initialized bytes in block 104 of the method 100 may be similar to initializing to an initialized value shown in FIG. 2, block 201A. The mixing the first byte of the plurality of initialized bytes in block 104 of the method 100 may be similar to the new column of data being mixed with the new input word shown in FIG. 2, block 201. The generating the plurality of mixed bytes in block 108 of the method 100 may be similar to a function of the advanced mixer shown in FIG. 2, block 202. The outputting in use the first predetermined set of the plurality of the first mixed byte in block 110 of the method 100 may be similar to outputting the new m column state (block 203) of FIG. 2.

Figure 3:
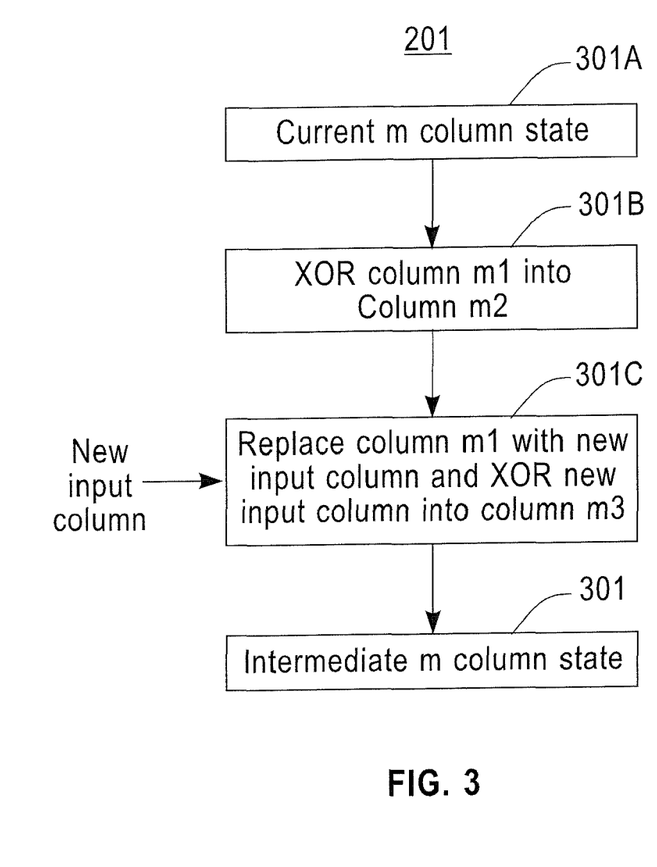
FIG. 3 illustrates a portion of the method of FIG. 2.

FIG. 3 illustrates a portion, such as a method 201, of the method 200 of FIG. 2. A current m column state may be provided (block 301A). An operation may be performed such that a column m1 may be exclusive-ORed into a column m2 (block 301B). The column m1 may remain in place. The column m1 may be replaced with a new input column and the new input column may be exclusive-ORed into a column m3 (block 301C). The new input column m1 may remain in place. An intermediate m column state may be generated (block 301) discussed in more detail below.

The method 200 of FIG. 2 may be termed a round function. The method 200 may have one or more iterations. In an embodiment of the method 201 shown in FIG. 3, one of the columns, e.g., column 0, may be exclusive-ORed into another column, e.g., column 10. The column 0 may be replaced by the input column. Some more columns may be exclusive-ORed into another set of columns. For instance, column 0 may itself be exclusive-ORed into column 8, and column 21 may be exclusive-ORed into column 1. A resulting state may be called an intermediate state.

Considering the method 201, in the method 100, the mixing the first byte of the plurality of initialized bytes with the first byte of the plurality of bytes may further include exclusive-ORing a column having the first byte of the plurality of initialized bytes into a column having the second byte of the plurality of bytes, such as in block 301B, segmenting a second plurality of bits, which may be a second or new block of raw data such as the new input column in block 301C, into a plurality of bytes, the plurality of bytes being a first byte, a second byte, continuing through an nth byte arranged at least in one of a column and a row, and exclusive-ORing a column having the first byte of the second plurality of bits into a column having a third byte of the plurality of bytes of the first plurality of bits, such as in the block 301C, to obtain an intermediate byte arranged at least in one of a column and a row, such as in the block 301. The at least in one of a column and a row may be at least in one of an intermediate column and intermediate row.

Figure 4:
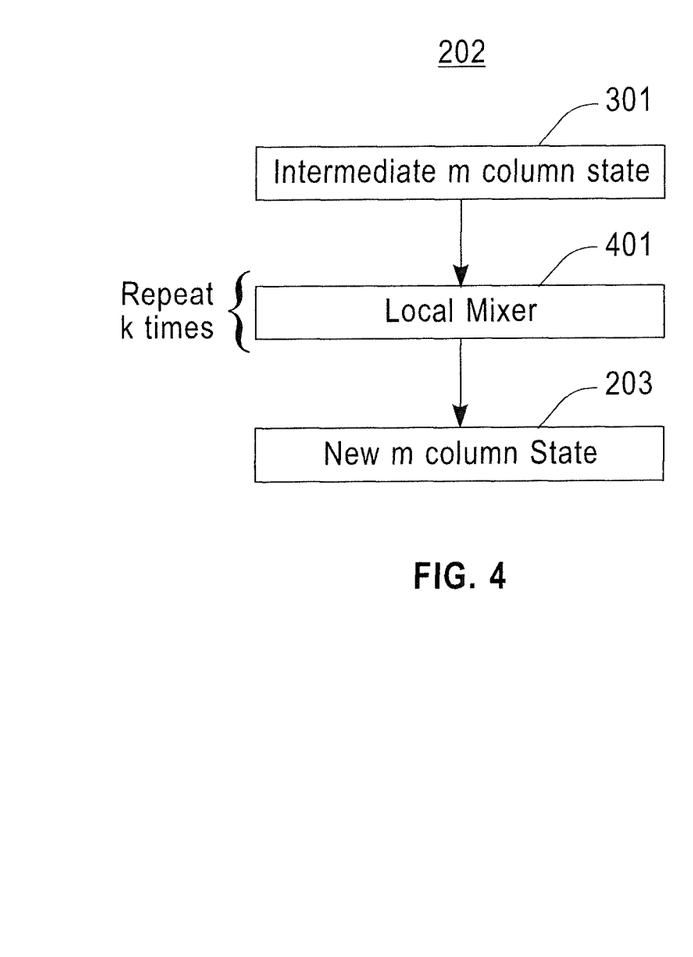
FIG. 4 illustrates another portion of the method of FIG. 2.

FIG. 4 illustrates another portion, the another portion being the method 202, of the method 200 of FIG. 2. The intermediate m column state may be provided (block 301) and input to a local mixer (block 401) described in more detail below. The local mixer may repeat an operation k times and outputs a new m column state (block 203). Accordingly, in the method 100, the generating the plurality of mixed bytes may be performed a first predetermined number of times, such as k times.

Figure 5:
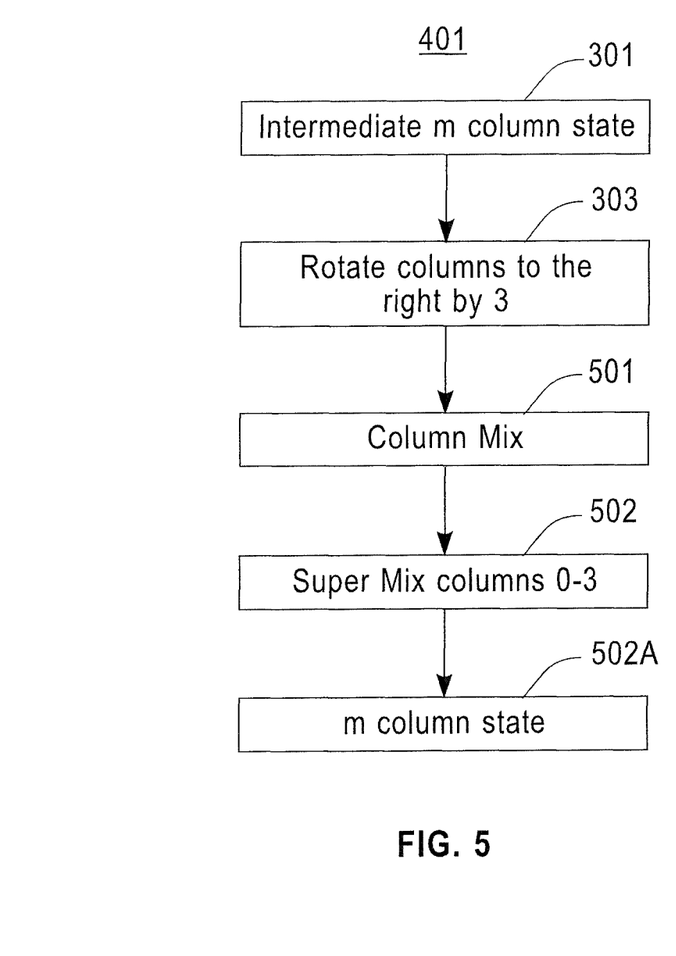
FIG. 5 illustrates a portion of a method of FIG. 4.

FIG. 5 illustrates a portion, the portion being the block 401 or the method 401, of the method 202 of FIG. 4. The intermediate m column state (block 301) may be provided. Columns may be rotated to the right by three columns (block 303). The columns may be mixed (block 501). Columns 0 through 3 may be super mixed as described below (block 502) in FIG. 7. An m column state may be output (block 502A).

Figure 6:
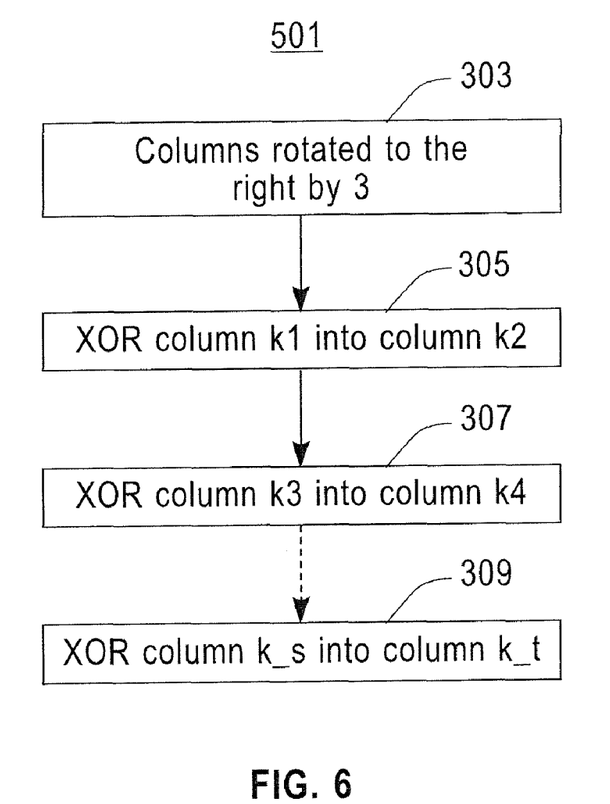
FIG. 6 illustrates a portion of a method of FIG. 5.

FIG. 6 illustrates a portion, the portion being the method 501 of FIG. 5. As described for the block 303 above, columns may be rotated to the right by 3 columns (block 303). An exemplary column k1 may be exclusive-ORed into another exemplary column k2 (block 305). Another exemplary column k3 may be exclusive-ORed into another exemplary column k4 (block 307). This process may be continued till a predetermined extent to exclusive-ORing an exemplary column k_s into another exemplary column k_t (block 309).

Figure 7:
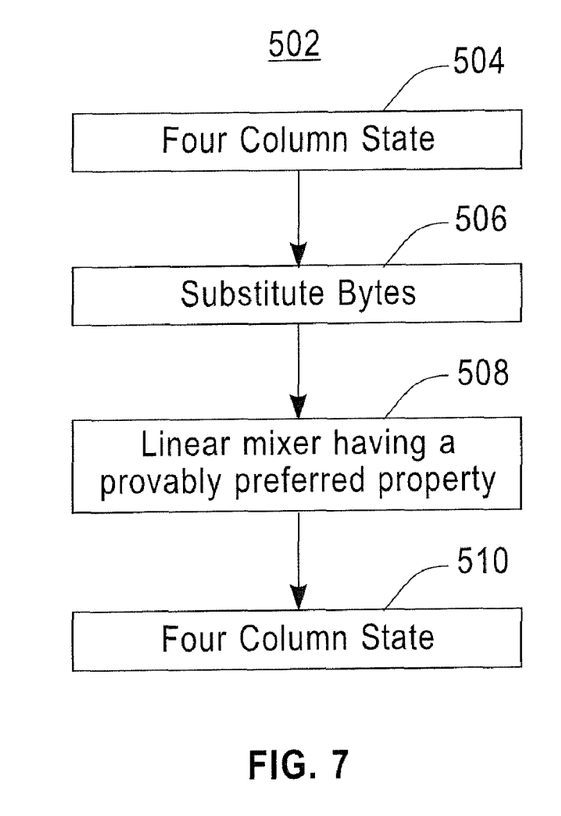
FIG. 7 illustrates a portion of the method of FIG. 5.

FIG. 7 illustrates a portion of the method, the method being the method 502 of FIG. 5. The method 502 describes the super mixing. A four column state may be provided (block 504). One or more bytes may be substituted (block 506). A linear mixing having a provably preferred property may be performed (block 508), described in more detail FIGS. 8 and 9 below. A four column state may be output (block 510).

A substitution of bytes, such as in four columns of 16 bytes, may be accomplished by a non-linear function. The non-linear function may be a block cipher of Advanced Encryption Standard (AES). The four columns so obtained may be mixed by a linear mixer. A linear mixer having a property that if the last three output columns are zero, then at least 13 input bytes (of a total of 16 bytes) may be non-zero. As such a property is provable and desirable, the property is termed a provably preferred property helping ensure there may be no differential attack of non-negligible probability. An embodiment of the current disclosure provides the provably preferred property over 30 columns (m=30). The value of m may have a preferred range of 27 through 36.

A process that may demonstrate the provably preferred properties for a large number of columns, from provably preferred properties for mixers which only mix four columns, may be described as follows. FIG. 4 shows the methods of an advanced mixer 202 (block 202 of FIG. 2 as well) indicating k repetitions of the local mixer (block 401). If k were just 1, then the resulting transformation may be just the column mix 501 followed by super-mix 502 (FIG. 5) of the columns 0 to 3 appropriately rotated, as a first step of local mixer 401 may be to rotate a column state by three. The column mix (block 501) may not provide the provably preferred property. The super-mix of columns 0-3 may provide the provably preferred property.

Now a case of k=2 is described. One may prove that a sequence of 7 columns out of the m columns in the intermediate column state (block 301) of FIG. 4, and the m columns in the new m column state (block 203) of FIG. 4 have related properties. One may suppose that all but the first column out of m columns in new m column state (block 203) are zero. Then it may be shown that all of the 7 columns in an in put sub-sequence, such as the intermediate m column state (block 301), may be non-zero. Further, only 6 bytes out of 7*4=28 bytes in the input sub-sequence may be zero.

The above may be shown by noting that the 4 out of the m columns of the new m column state (block 203) were obtained by the super-mix operation 502 (FIG. 5) of the latter of the k=2 local mixing steps (block 401 of FIG. 4). However, by the given property of the super-mix as described in the method 502 of FIG. 7, and because all but the first column of the new m column state (block 203) are zero, it follows that all of the 4 columns in the state just preceding the super-mix (block 501 preceding block 502 of FIG. 5) may be non-zero, and further have only 3 bytes out of 4*4 bytes as zeros. The column mix (block 501) may be ignored, as it may have no contribution, as the added columns may be assumed to be zero. The rotating of the columns to the right by 3 (block 303, FIG. 5) has an effect that the super mixing (block 502 of FIG. 5) of the k=2 local mixing events (block 401 of FIG. 4) produces as its output (block 502A of FIG. 5) four columns, three out of which may be zero, and one may be non-zero.

Thus, by repeating super mixing once more, corresponding 4 columns in the input (from block 501 of FIG. 5) to the super mixing (block 502 of FIG. 5) may be all non-zero, and may further have only 3 bytes zero from among the 4*4 bytes. Thus, all of the 7 columns of the input (from block 501 of FIG. 5) may be non-zero, and there may be a maximum of 3+3=6 zero bytes from the 7*4 bytes in these input columns (from block 501 of FIG. 5). A similar concept may be used to obtain provably preferred properties over wider column states, e.g., k>2.

Accordingly, in the method 201 of FIG. 3, the exclusive-ORing the column m1 having the first byte of the second plurality of bits (block 301B) may further include rotating an intermediate column to a third position to a right of the intermediate column (blocks 301 and 303 of the method 401 of FIG. 5). In the method 201 of FIG. 3, the exclusive-ORing the column m1 having the first byte of the second plurality of bits (block 301B) may include mixing at least two intermediate columns, such as k1 into k2 and k3 into k4 as shown in blocks 301, 303 of FIG. 5 and blocks 305, 307, 309 of FIG. 6. The method 201 of FIG. 3, wherein the exclusive-ORing the column having the first byte of the second plurality of bits may include mixing a first set of four columns (block 504) wherein mixing the first set of four columns may further include substituting a plurality of bytes (block 506), mixing linearly a plurality of substituted bytes, and outputting in use a second set of four columns, such as a four column state (block 510).

In the method 401 of FIG. 5, the rotating the intermediate column to the third position to the right of the intermediate column (blocks 301, 303) may include exclusive-ORing a first rotated column with a second rotated column (block 303 of FIG. 6), exclusive-ORing a third rotated column with a fourth rotated column (block 307 of FIG. 6), and exclusive-ORing continued through a predetermined number of rotated columns (block 309 of FIG. 6).

Figure 8:
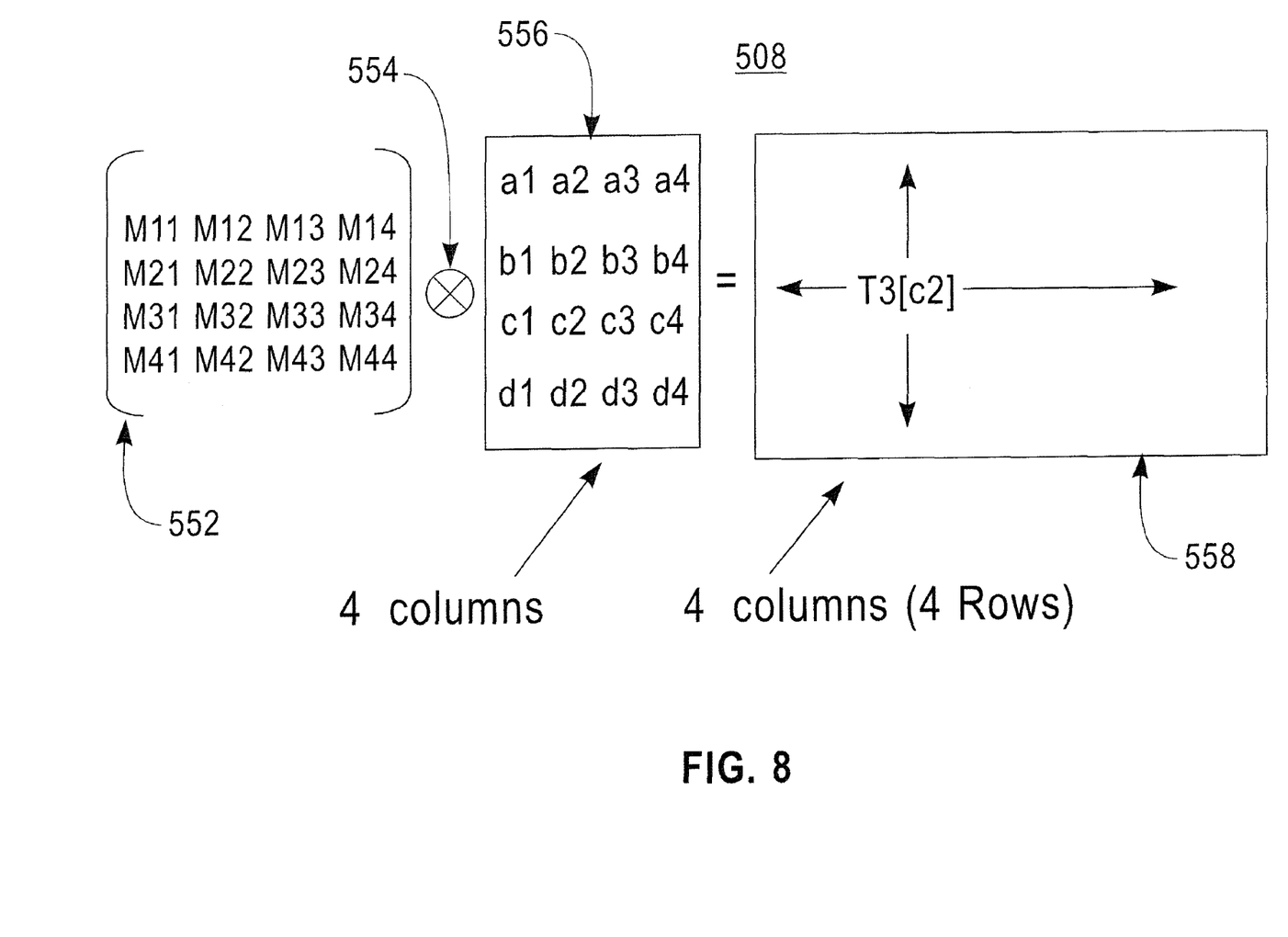
FIG. 8 illustrates a portion of a method of FIG. 7.

FIG. 8 illustrates a portion, the portion being the method 508, of a method of FIG. 7. A matrix 552 is multiplied with four columns of input bytes 556 a1 through d4. A symbol 554 indicates a multiplication over a Galois field (GF). An output column 558 of 4 columns is generated. The matrix 552 may be a minimum distance separable matrix. The arrows shown in the output column 558 indicate operation in a row and a column as described below.

M11, M12, . . . , M43, and M44 may be 8-bit constants, possibly positive or negative. The output column 558 shows "T3[c2]" as an entry. A table T3 may be a table indicating a multiplication of a third column of the matrix 552 by a byte c2 of input bytes 556 wherein the multiplication may be stored in the table T3, wherein the entries in the table T3 may be indexed by the byte c2. In an exemplary method, M11, M12, . . . , M43, and M44 may be bytes which may possibly be viewed as elements of a finite field $GF(2^8)$, i.e., the finite field having 256 elements. Similarly, entries in the input bytes 556, and the output column 558 may be bytes, possibly viewed as elements in the same finite field. A matrix multiplication may be considered over the finite field. It is known in the art that an addition of two elements in the finite field is same as performing a bit-wise exclusive-OR (XOR) of the two elements, each element possibly being a byte or an 8-bit value.

In one embodiment, the constants M11, M21, M31 and M41 may be set to 00000001, 00000001, 00000010, and 00000111 respectively. As a person having ordinary skill in the art would appreciate, in a field $GF(2^8)$, elements of the fields which are 8-bit quantities may also be viewed as degree 7 binary polynomials. Thus, 00000111 is the polynomial $x^2+x+1$, and 00000010 is the polynomial x, and 00000001 is 1. Further, the field $GF(2^8)$ may be defined by an underlying irreducible polynomial, which in the present embodiment may be $x^8+x^4+x^3+x+1$.

In another embodiment, the constants M11, M21, M31 and M41 may be set to 00000001, 00000001, 00000111, and 00000100 respectively, or in terms of $GF(2^8)$, the constants may be set to the polynomials 1, 1, $x^2+x+1$, and $x^2$ respectively.

In the method 508, organizing a first plurality of data, such as the input bytes 556, into a second plurality of data, such as the output column 558, may include performing at least one logic operation on at least one of the first plurality of data, such as the input bytes 556 and the second plurality of data, such as the output column 558. The performing the at least one logic operation may include performing at least one of an AND operation and an exclusive-OR operation. Further, the performing the at least one logic operation may include exclusive-ORing a byte of the at least one of the first plurality of data, such as the input bytes 556, into a column having the byte c2 (vertical arrows shown in the output column 558) and transposing the column and exclusive-ORing the column into a row having the byte c2 (vertical arrows shown in the output column 558).

In the method 508, providing the first plurality of data, such as the input bytes 556, having a second plurality of bits may include arranging the first plurality of data into a p by q matrix where p and q are positive numbers. The arranging the first plurality of data into a p by q matrix may include identifying the first plurality of data by a byte including a first number and a second number, the first number being associated with one of a row number and a column number and the second number being associated with one of a row number and a column number. The first number and the second number may be subscripts as known in matrix algebra. The row number and the column number may be of a matrix. Further, the identifying the first plurality of data by a byte including a first number and a second number may include associating the row number to a row of a location of the byte, possibly in a matrix, and associating the column number to a column of the location of the byte, possibly in a matrix.

In the method 508, a processing the first plurality of data, such as the input bytes 556, into the plurality of table indices, such as the byte c2 shown in the output column 558 of FIG. 8, may include setting the first plurality of data as one of the plurality of table indices.

In the Method 508, providing the plurality of tables may include providing at least one of a matrix, a circulant matrix, and a minimum distance separable matrix. Circulant matrices have a property that each column is a rotation of entries of other columns. For example, a second column is a rotation of the first column by one byte. Thus, the entire matrix may be specified by specifying the first column and rotating the first column appropriately to generate the other columns.

Figure 9:
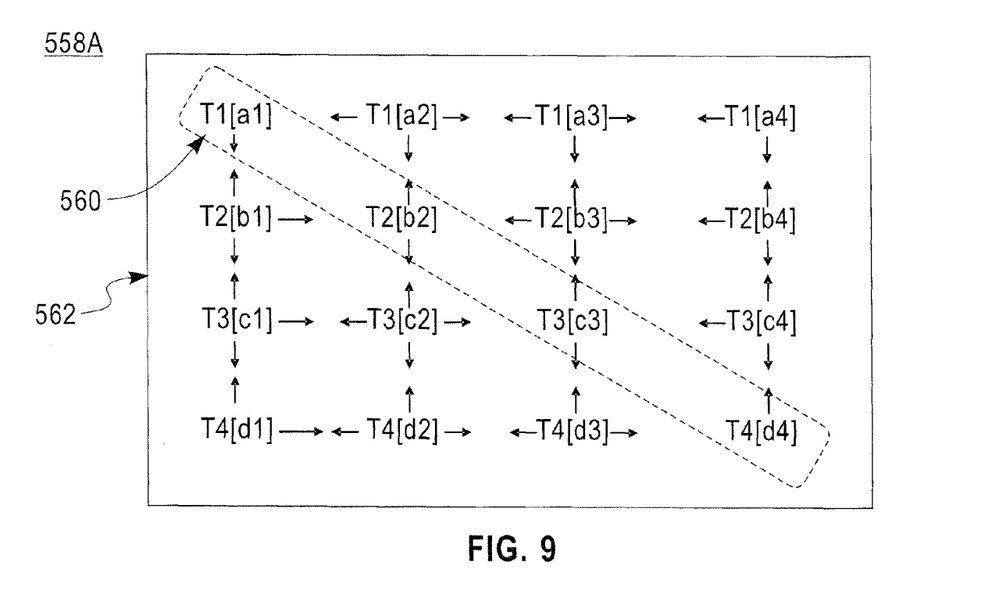
FIG. 9 illustrates a portion of FIG. 8.

FIG. 9 illustrates a portion of FIG. 8, the portion being a method 558A. In the method 558A, transposing the column and exclusive-ORing the column into the row having the byte c2 may include omitting transposing the column having the byte c2 and omitting exclusive-ORing the column for a byte located on a diagonal 560 as shown in FIG. 9. Vertical arrows indicate an exclusive-OR operation and horizontal arrows indicate a transposing and an exclusive-OR operation.

Alternatively, in the method 508 of FIG. 7 and also described in FIGS. 8 and 9, the mixing linearly the plurality of substituted bytes (block 508) may include exclusive-ORing one of the plurality of substituted bytes into a column having the one of the plurality of substituted bytes and transposing the column and exclusive-ORing the column into a row having the one of the plurality of substituted bytes (block 558 of FIG. 8). Further, in the method 508, the transposing the column and exclusive-ORing the column may include omitting transposing the column and omitting exclusive-ORing the column for the one of the plurality of substituted bytes located on a diagonal 560 in the output column 562 shown in the method 558A of FIG. 9.

Figure 10:
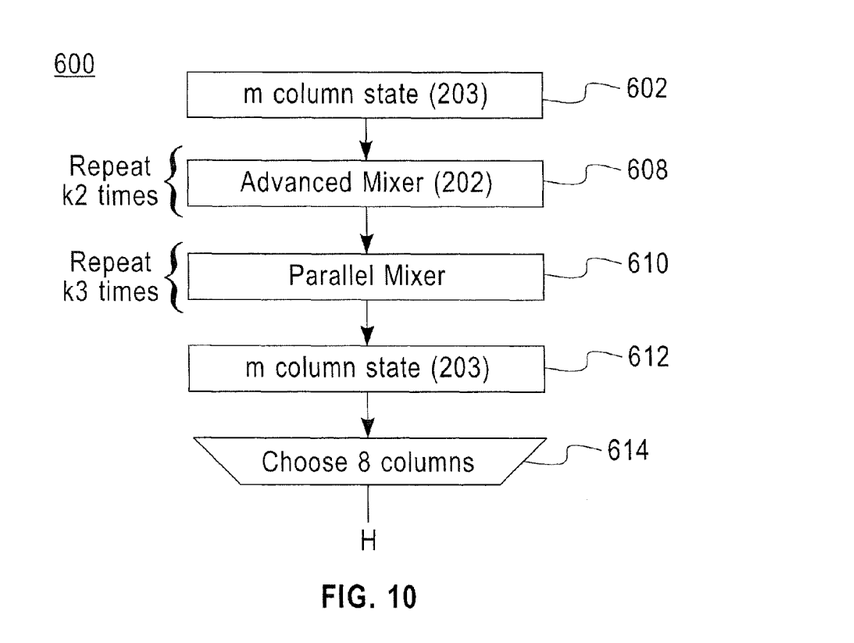
FIG. 10 is an embodiment of a method of the present disclosure.

FIG. 10 is an embodiment of a method 600 of the present disclosure. FIG. 10 illustrates a compressor, based on the method 600, of the present disclosure. An m column state may be provided (block 602), which may have been obtained by processing the input words processed in multiple rounds.

An advanced mixing may be performed (block 608) to the m column state multiple times, e.g., 5 times. A parallel mixing may be performed (block 610) to obtain a further m column state (block 612) another multiple times, e.g., 10 or 11 times.

Accordingly, in the method 100, the outputting in use the first predetermined set of the plurality of the first mixed byte, the second mixed byte, continuing through the nth mixed byte (block 203 of FIG. 2 described further in the method 600 of FIG. 10) may further include generating a further plurality of mixed bytes (block 608, FIG. 10), the further plurality of mixed bytes being a first mixed byte, a second mixed byte, continuing through an nth mixed byte such that for a third predetermined number of one or more non-zero columns of the further plurality of mixed bytes, and for a fourth predetermined number of one or more zero columns of the further plurality of mixed bytes, wherein the third and fourth predetermined number of one or more non-zero columns have a respective mixed byte of the further plurality of mixed bytes, one or more columns, having one or more of a respective mixed byte of the first predetermined set, are non-zero, mixing the further plurality of mixed bytes in a parallel manner (block 610, FIG. 10), and outputting in use a second predetermined set of bytes generated from the mixing the further plurality of mixed bytes in a parallel manner (block 612, FIG. 10). A hash of 8 columns may be chosen (block 614, FIG. 10).

In an embodiment of the method 600, only a left-most column of the further plurality of mixed bytes may be non-zero. In another embodiment of the method 600, one or more columns, in addition to the left most column, may be non-zero. It should be noted that "non-zero" may mean a byte to be having some non-zero bits. It should be noted that "non-zero" may mean a column to be having some non-zero bytes possibly having a combination of 1s and 0s.

Figure 11:
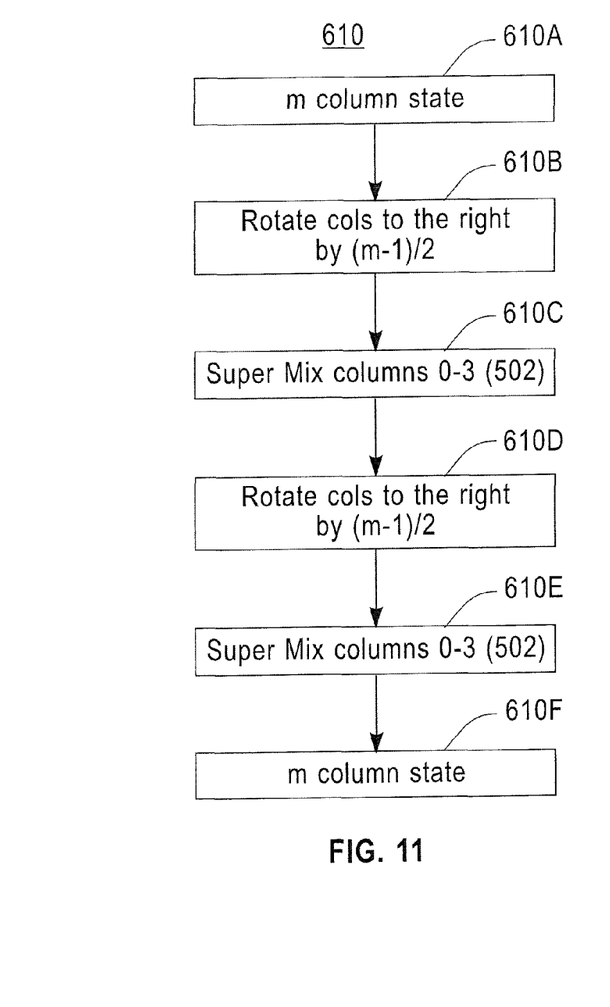
FIG. 11 illustrates an embodiment of a portion of a method of FIG. 10.

In the method 600, the mixing the further plurality of mixed bytes in the parallel manner (block 610, FIG. 10) may further include mixing the further plurality of mixed bytes in the parallel manner for an odd number of columns (method 610, FIG. 11).

Figure 12:
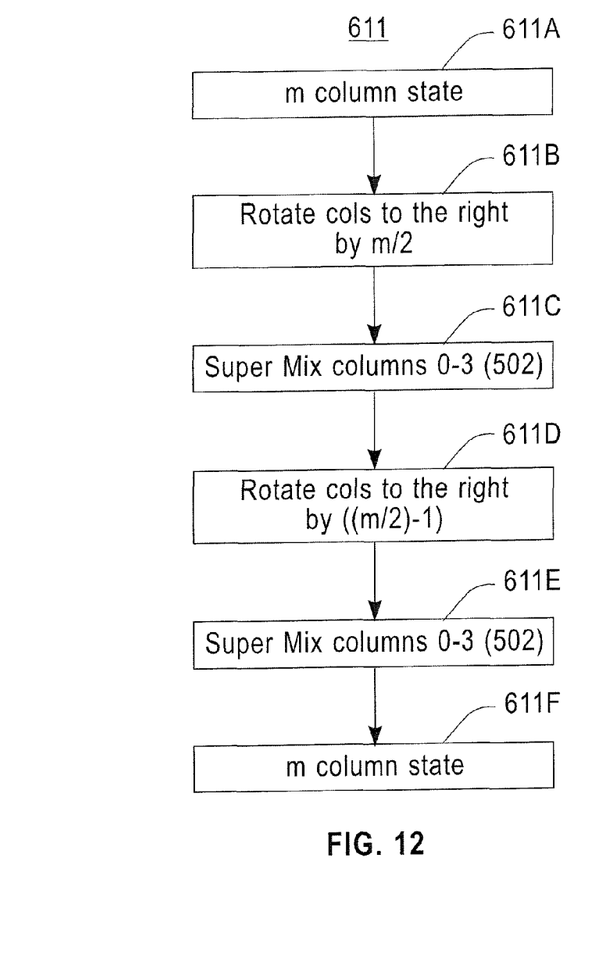
FIG. 12 illustrates another embodiment of the portion of the method of FIG. 10.

In the method 600, the mixing the further plurality of mixed bytes in the parallel manner may further include mixing the further plurality of mixed bytes in the parallel manner for an even number of columns (method 611, FIG. 12). In the method 600, the second predetermined set of bytes may be located in eight columns. That is, a subset of 8 columns of the m column state may be output as a hash value H (block 614). In the method 600, the generating the further plurality of mixed bytes may be performed a predetermined k2 number of times (method 608, FIG. 10). In the method 600, the mixing the further plurality of mixed bytes in the parallel manner may be performed a predetermined k3 number of times (method 610, FIG. 10).

A method 600 may include providing a first predetermined set of a plurality of a first mixed byte, a second mixed byte, continuing through an nth mixed byte arranged at least in one of a column and a row (method 602, FIG. 10), generating a further plurality of mixed bytes, the further plurality of mixed bytes being a first mixed byte, a second mixed byte, continuing through an nth mixed byte such that for a first predetermined number of one or more non-zero columns of the further plurality of mixed bytes, and for a second predetermined number of one or more zero columns of the further plurality of mixed bytes, wherein the first and second predetermined number of one or more non-zero columns have a respective mixed byte of the further plurality of mixed bytes, one or more columns, having one or more of a respective mixed byte of the first predetermined set, are non-zero (method 608, FIG. 10), mixing the further plurality of mixed bytes in a parallel manner (method 610, FIG. 10), and outputting in use a second predetermined set of bytes generated from the mixing the further plurality of mixed bytes in a parallel manner (method 612, FIG. 10). The second predetermined set may be a hash of 8 columns.

In an embodiment of the above method, only a left-most column of the further plurality of mixed bytes may be non-zero. In another embodiment of the above method, one or more columns, in addition to the left most column, may be non-zero. It should be noted that "non-zero" may mean a byte to be having some non-zero bits. It should be noted that "non-zero" may mean a column to be having some non-zero bytes possibly having a combination of 1s and 0s.

In another embodiment the method 600 of the present disclosure, a hash may be generated by choosing columns 1, 2, 3, 4 and 15, 16, 17, and 18 in the case of m=30, thereby having columns 0-29. The value of m may have a preferred range of 27 through 36.

In the method 600, the outputting in use the second predetermined set of bytes generated from the mixing the further plurality of mixed bytes in the parallel manner (method 612, FIG. 10) may include arranging the second predetermined set of bytes in eight columns (method 614, FIG. 10).

In the method 600, the generating the further plurality of mixed bytes (method 608, FIG. 10) may include exclusive-ORing one of the plurality of mixed bytes into a column having the one of the plurality of mixed bytes and transposing the column and exclusive-ORing the column into a row having the one of the plurality of mixed bytes as shown in methods 508 (FIG. 8) and 558 (FIG. 9).

FIG. 11 illustrates an embodiment of a portion of the method 610 of FIG. 10. The method 610 of making the parallel mixer is described in FIG. 11. An m column state may be provided (block 610A). If the m column state size is odd (e.g., m=27), the state may be rotated to the right by (m−1)/2 (i.e., 13 columns) (block 610B). Columns 0 to 3 may be super-mixed (block 610C) as described in FIG. 7. The columns may be rotated to the right again by (m−1)/2 (i.e., 13 columns) (block 610D), and yet again the columns 0 to 3 may be super-mixed (block 610E). An output of an m column state may be obtained (block 610F).

FIG. 12 illustrates another embodiment, that is, a method 611, of the portion of the method 610 of FIG. 10. An m column state may be provided (block 611A). If the m column state size is even (e.g., m=30), then the m column state is rotated by m/2 (i.e., 15 columns) (block 611B), followed by a super-mixing (block 611C), and an (m/2)−1 column (i.e., 14) rotation (block 611D) to the right, followed by another super-mixing (block 611E). An output of an m column state may be obtained (block 611F).

Figure 13:
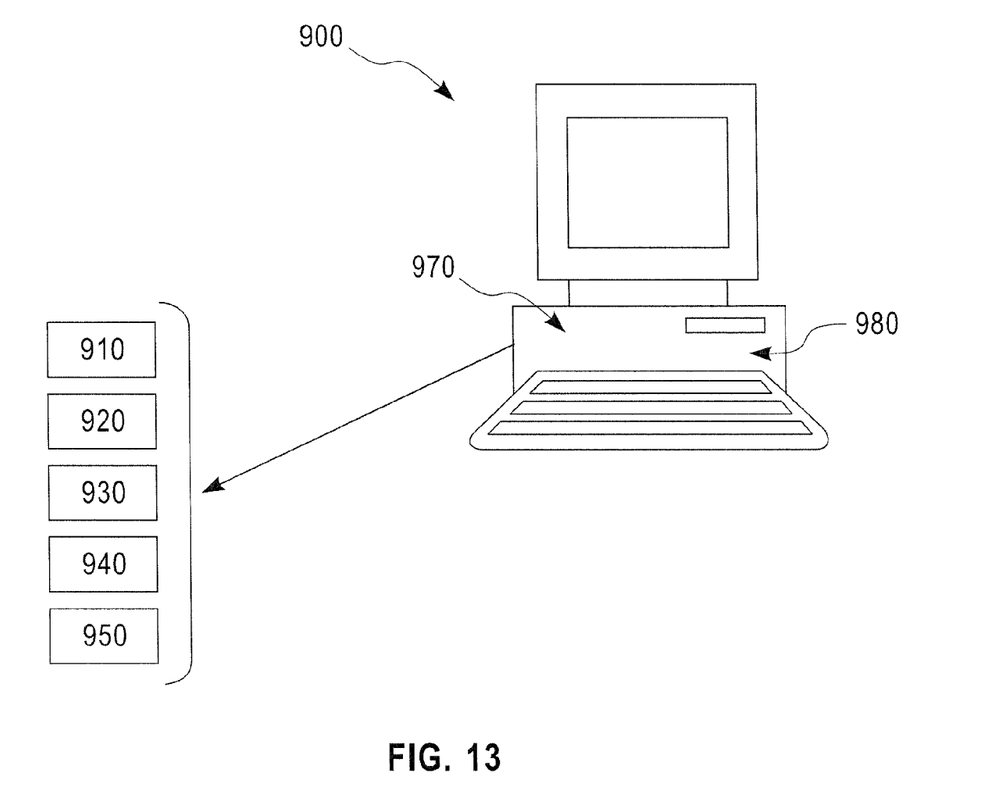
FIG. 13 illustrates an embodiment of a system of the present disclosure.

FIG. 13 illustrates an embodiment of a system 900 of the present disclosure. The system 900 may include a segmenting device 910 configured to segment a first plurality of bits into a plurality of bytes, the plurality of bytes being a first byte, a second byte, continuing through an nth byte arranged at least in one of a column and a row, a processor 920 coupled to the segmenting device 910, the processor 920 being configured to generate a plurality of initialized bytes arranged at least in one of a column and a row, a mixer 930 coupled to the processor 920, the mixer 920 being configured to mix a first byte of the plurality of initialized bytes with the first byte of the plurality of bytes to generate a first output byte, mixing a second byte of the plurality of initialized bytes with the second byte of the plurality of bytes to generate a second output byte, continuing through iteratively to mix an nth byte of the plurality of initialized bytes with the nth byte of the plurality of bytes to generate an nth output byte, the output bytes arranged at least in one of a column and a row, a generating device 940 coupled to the mixer 930, the generating device 940 being configured to generate a plurality of mixed bytes, the plurality of mixed bytes being a first mixed byte, a second mixed byte, continuing through an nth mixed byte such that for a first predetermined number of one or more non-zero columns of the plurality of mixed bytes, and for a second predetermined number of one or more zero columns of the plurality of mixed bytes, wherein the first and second predetermined number of one or more non-zero columns have a respective mixed byte of the plurality of mixed bytes, one or more columns, having one or more of a respective output byte of the output bytes, are non-zero, and an output device 950 coupled to the generating device 940, the output device 950 being configured to output a first predetermined set of a plurality of the first mixed byte, the second mixed byte, continuing through the nth mixed byte, the first predetermined set arranged at least in one of a column and a row. The first predetermined set may be a hash H as shown in FIG. 10.

In an embodiment of the system 900, only a left-most column of the plurality of mixed bytes may be non-zero. In another embodiment of the system 900, one or more columns, in addition to the left-most column, may be non-zero. It should be noted that "non-zero" may mean a byte to be having some non-zero bits. It should be noted that "non-zero" may mean a column to be having some non-zero bytes possibly having a combination of 1s and 0s.

In the system 900, the generating device 940 may be further configured to exclusive-OR one of the plurality of mixed bytes into a column having the one of the plurality of mixed bytes and transposing the column and exclusive-ORing the column into a row having the one of the plurality of mixed bytes as shown in FIGS. 8-9.

Another system, to implement the method 600 of FIG. 10, for example, may include a processor configured to provide a first predetermined set of a plurality of a first mixed byte, a second mixed byte, continuing through an nth mixed byte arranged at least in one of a column and a row, a generating device coupled to the processor, the generating device being configured to generate a further plurality of mixed bytes, the further plurality of mixed bytes being a first mixed byte, a second mixed byte, continuing through an nth mixed byte such that for a first predetermined number of one or more non-zero columns of the further plurality of mixed bytes, and for a second predetermined number of one or more zero columns of the further plurality of mixed bytes, wherein the first and second predetermined number of one or more non-zero columns have a respective mixed byte of the further plurality of mixed bytes, one or more columns, having one or more of a respective mixed byte of the first predetermined set of the plurality of mixed bytes, are non-zero, a mixer coupled to the generating device, the mixer being configured to mix the further plurality of mixed bytes in a parallel manner, and an output device coupled to the mixer, the output device being configured to output in use a second predetermined set of bytes generated from the mixing the further plurality of mixed bytes in a parallel manner. The second predetermined set may be a hash H as shown in FIG. 10.

In an embodiment of the above system, only a left-most column of the plurality of mixed bytes may be non-zero. In another embodiment of the above system, one or more columns, in addition to the left most column, may be non-zero. It should be noted that "non-zero" may mean a byte to be having some non-zero bits. It should be noted that "non-zero" may mean a column to be having some non-zero bytes possibly having a combination of 1s and 0s.

In the another system, the generating device may be further configured to exclusive-OR one of the plurality of mixed bytes into a column having the one of the plurality of mixed bytes and transposing the column and exclusive-ORing the column into a row having the one of the plurality of mixed bytes as shown in FIGS. 8-9.

As a person skilled in the art would appreciate, the system 900 may include a computer 970 having the computer program product 980. As shown, the computer 970 may also include the segmenting device 910, the processor 920, the mixer 930, the generating device 940, and the output device 950 coupled to respective components as described above in a manner known in the art, such as electromagnetically, time-multiplexed, and space-multiplexed.

The foregoing method 100 or elements of the method 100 could also be stored on a computer-readable storage medium having computer-executable instructions to implement the method 100 or the elements of the method 100. A computer program product 980, shown in FIG. 13, may have computer-executable instructions for: segmenting a first plurality of bits into a plurality of bytes, the plurality of bytes being a first byte, a second byte, continuing through an nth byte arranged at least in one of a column and a row, such as in the block 102 of the method 100, generating a plurality of initialized bytes arranged at least in one of a column and a row, such as in the block 104 of the method 100, mixing a first byte of the plurality of initialized bytes with the first byte of the plurality of bytes to generate a first output byte, mixing a second byte of the plurality of initialized bytes with the second byte of the plurality of bytes to generate a second output byte, continuing through iteratively to mix an nth byte of the plurality of initialized bytes with the nth byte of the plurality of bytes to generate an nth output byte, the output bytes arranged at least in one of a column and a row, such as in the block 106 of the method 100, generating a plurality of mixed bytes, the plurality of mixed bytes being a first mixed byte, a second mixed byte, continuing through an nth mixed byte such that for a first predetermined number of one or more non-zero columns of the plurality of mixed bytes, and for a second predetermined number of one or more zero columns of the plurality of mixed bytes, wherein the first and second predetermined number of one or more non-zero columns have a respective mixed byte of the plurality of mixed bytes, one or more columns, having one or more of a respective output byte of the output bytes, are non-zero, such as in the block 108 of the method 100, and outputting in use a first predetermined set of a plurality of the first mixed byte, the second mixed byte, continuing through the nth mixed byte, the first predetermined set arranged at least in one of a column and a row, such as in the block 110 of the method 100.

In the computer program product 980, the generating the plurality of mixed bytes comprises exclusive-ORing one of the plurality of mixed bytes into a column having the one of the plurality of mixed bytes and transposing the column and exclusive-ORing the column into a row having the one of the plurality of mixed bytes.

Another computer program product, to implement the method 600 of FIG. 10, for example, may have computer-executable instructions for: providing a first predetermined set of a plurality of a first mixed byte, a second mixed byte, continuing through an nth mixed byte arranged at least in one of a column and a row, generating a further plurality of mixed bytes, the further plurality of mixed bytes being a first mixed byte, a second mixed byte, continuing through an nth mixed byte such that for a first predetermined number of one or more non-zero columns of the further plurality of mixed bytes, and for a second predetermined number of one or more zero columns of the further plurality of mixed bytes, wherein the first and second predetermined number of one or more non-zero columns have a respective mixed byte of the further plurality of mixed bytes, one or more columns, having one or more of a respective mixed byte of the first predetermined set of the plurality of mixed bytes, are non-zero, mixing the further plurality of mixed bytes in a parallel manner, and outputting in use a second predetermined set of bytes generated from the mixing the further plurality of mixed bytes in a parallel manner. The second predetermined set may be a hash of 8 columns.

As a person having an ordinary skill in the art would appreciate, an arrow entering a block or a symbol indicates an input and an arrow leaving a block or a symbol indicates an output. Similarly, connections described below may be of any electromagnetic type, such as electrical, optical, radio-frequency, and magnetic.

The terminology used herein is for the purpose or describing particular embodiments only and is not intended to be limiting or the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. An embodiment was chosen and described in order to best explain the principles of the invention and the practical application, and to enable others of ordinary skill in the art to understand the invention for various embodiments with various modifications as are suited to the particular use contemplated.

As a person having ordinary skill in the art would appreciate, the elements or blocks of the methods described above could take place at the same time or in an order different from the described order.

It should be emphasized that the above-described embodiments are merely some possible examples of implementation, set forth for a clear understanding of the principles of the disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:
1. A method comprising:
configuring at least one processor to perform functions comprising:
organizing a plurality of columns of input bytes;
generating an initial matrix comprising a plurality of columns of bytes;
mixing a first column of input bytes into the initial matrix to create an intermediate matrix;
for each of the subsequent columns of input bytes;
mixing the column of input bytes into the intermediate matrix;

performing a first mixing operation on the intermediate matrix to produce a new intermediate matrix, wherein the first mixing operation acts in such a way that, in order for the first mixing operation to generate a predetermined combination of zero columns for the new intermediate matrix, a predetermined number of the columns of the intermediate matrix, as they existed before the first mixing operation, must be non-zero;

using the new intermediate matrix as the intermediate matrix;

upon mixing of all of the input columns into the intermediate matrix, performing a second mixing operation on the intermediate matrix; and selecting as an output a subset of columns of the intermediate matrix.

2. The method of claim 1, wherein
the initial matrix comprises an initial m column state comprising m matrix columns, wherein each of the matrix columns is a column of bytes; and wherein performing the first mixing operation on the intermediate matrix comprises applying a mixer to two or more of the m matrix columns to produce a mixed m column state, wherein the mixer operates to mix within each of the columns and to mix across at least two of the columns, wherein the two or more of the m matrix columns include a column into which the input column has been mixed.

3. The method of claim 2, wherein mixing at least one input column into one of the m matrix columns comprises exclusive-ORing a first and a second of the matrix columns, replacing the first matrix column with the at least one input column to create a new matrix column and exclusive-ORing the new matrix column into a third matrix column.

4. The method of claim 3, wherein applying the mixer to two or more of the m matrix columns comprises performing the mixing operation on all of the m matrix columns.

5. The method of claim 3, wherein mixing the at least one input column into one of the matrix columns is followed by mixing the m matrix columns.

6. The method of claim 5, wherein mixing the m matrix columns comprises rotating the m matrix columns into new positions and performing a column mix on the m matrix columns.

7. The method of claim 6, wherein performing the column mix is followed by substituting each byte in the subset of columns and applying a super mixer to the subset of columns, wherein the super mixer operates such that mixing of at least one of the substituted bytes affects a column in which the substituted byte appears and a row in which the substituted byte appears.

8. The method of claim 7, wherein mixing a substituted byte comprises exclusive-ORing a substituted byte into a column in which the substituted byte appears, transposing the column, and exclusive-ORing the column into a row in which the substituted byte appears.

9. The method of claim 8, wherein the super mixer omits transposing a column in which a substituted byte appears and exclusive-ORing the column into a row in which the substituted byte appears of the substituted byte lies on a diagonal of the subset of columns.

10. The method of claim 8, wherein the super mixer mixes n columns, where n is less than m, and wherein the super mixer is applied repeatedly so as to operate on all of the m columns.

11. The method of claim 10, wherein rotating the m matrix columns is conducted such that a new subset of columns is brought into position for operation of the super mixer on the new subset of columns.

12. The method of claim 11, wherein the subset of columns comprises four columns and the rotation is conducted so as to rotate the m matrix columns through three positions.

13. The method of claim 7, further comprising:
performing the mixing operation on the mixed m column state through a plurality of iterations;
performing a parallel mixing operation on the mixed m column state through a plurality of iterations to produce a resulting m column state;
wherein the parallel mixing operation comprises:
if the number m is odd, rotating the m columns through (m−1)/2 positions and, if the number m is even, rotating the m columns through (m/2)−1 positions;
applying the super mixer to a subset of the columns of the m column state;
if the number m is odd, rotating the m columns through (m−1)/2 positions and, if the number m is even, rotating the m columns through m/2 positions; and
applying the super mixer to a subset of the columns of the m column state; and
selecting a subset of columns of the resulting m column state as a final output.

14. The method of claim 6, wherein performing a column mix comprises, for all of the m columns, exclusive-ORing each pair of adjacent columns.

15. The method of claim 6, wherein performing the column mix is followed by mixing a subset of four columns using a linear mixer having the property that if the last three output columns are zero, then at least 13 out of a total of 16 input bytes are non-zero.

16. The method of claim 2, wherein mixing the at least one input column into one of the matrix columns and mixing the two or more of the m matrix columns are carried out iteratively so as to mix all of the input columns into the m matrix columns.

17. A method comprising:
configuring at least one processor to perform the functions of:
generating an initial matrix comprising a plurality of columns of bytes;
mixing a first column of input bytes into the initial matrix to create an intermediate matrix;
for each of the subsequent columns of input bytes;
mixing the column of input bytes into the intermediate matrix;
performing a first mixing operation on the intermediate matrix to produce a new intermediate matrix, wherein the first mixing operation acts in such a way that, in order for the first mixing operation to generate a predetermined combination of zero columns for the new intermediate matrix, a predetermined number of the columns of the intermediate matrix, as they existed before the first mixing operation, must be non-zero, and wherein the first mixing operation comprises applying a mixer to two or more of the matrix columns, wherein the mixer exhibits provable redundancy properties;
using the new intermediate matrix as the intermediate matrix;
upon mixing of all of the input columns into the intermediate matrix, performing a second mixing operation on the intermediate matrix; and selecting as an output a subset of columns of the intermediate matrix.

18. An apparatus comprising:
at least one processor;
memory storing a program of instructions;
wherein execution of the program of instructions by the at least one processor configures the apparatus to perform the functions of:
generating an initial matrix comprising a plurality of columns of bytes;
mixing a first column of input bytes into the initial matrix to create an intermediate matrix;
for each of the subsequent columns of input bytes;
   mixing the column of input bytes into the intermediate matrix;
   performing a first mixing operation on the intermediate matrix to produce a new intermediate matrix, wherein the mixing operation acts in such a way that, in order for the first mixing operation to generate a predetermined combination of zero columns for the new intermediate matrix, a predetermined number of the columns of the intermediate matrix, as they existed before the first mixing operation, must be non-zero;
   using the new intermediate matrix as the intermediate matrix;
upon mixing of all of the input columns into the intermediate matrix, performing a second mixing operation on the intermediate matrix; and
selecting as an output a subset of columns of the intermediate matrix.

19. The apparatus of claim 18, wherein the initial matrix comprises an initial m column state comprising m matrix columns, wherein each of the matrix columns is a column of bytes; and wherein performing the mixing operation on the intermediate matrix comprises applying a mixer to two or more of the m matrix columns to produce a mixed m column state, wherein the mixer operates to mix within each of the columns and to mix across at least two of the columns, wherein the two or more of the m matrix columns include a column into which the input column has been mixed.

20. The apparatus of claim 19, wherein mixing at least one input column into one of the m matrix columns comprises exclusive-ORing a first and a second of the matrix columns, replacing the first matrix column with the at least one input column to create a new matrix column and exclusive-ORing the new matrix column into a third matrix column.

21. The apparatus of claim 20, wherein performing the mixing operation on two or more of the m matrix columns comprises performing the mixing operation on all of the m matrix columns.

22. A non-transitory computer readable medium storing a program of instructions, execution of which by a processor configures an apparatus to perform functions comprising:
generating an initial m column state comprising m matrix columns, wherein each of the matrix columns is a column of bytes;
generating an initial matrix comprising a plurality of columns of bytes;
mixing a first column of input bytes into the initial matrix to create an intermediate matrix;
for each of the subsequent columns of input bytes;
   mixing the column of input bytes into the intermediate matrix;
   performing a first mixing operation on the intermediate matrix to produce a new intermediate matrix, wherein the mixing operation acts in such a way that, in order for the first mixing operation to generate a predetermined combination of zero columns for the new intermediate matrix, a predetermined number of the columns of the intermediate matrix, as they existed before the first mixing operation, must be non-zero;
   using the new intermediate matrix as the intermediate matrix;
upon mixing of all of the input columns into the intermediate matrix, performing a second mixing operation on the intermediate matrix; and
selecting as an output a subset of columns of the intermediate matrix.

23. The computer readable medium of claim 22, wherein the initial matrix comprises an initial m column state comprising m matrix columns, wherein each of the matrix columns is a column of bytes; and wherein performing the mixing operation on the intermediate matrix comprises applying a mixer to two or more of the m matrix columns to produce a mixed m column state, wherein the mixer operates to mix within each of the columns and to mix across at least two of the columns, wherein the two or more of the m matrix columns include a column into which the input column has been mixed.

24. The computer readable medium of claim 23, wherein mixing at least one input column into one of the m matrix columns comprises exclusive-ORing a first and a second of the matrix columns, replacing the first matrix column with the at least one input column to create a new matrix column and exclusive-ORing the new matrix column into a third matrix column.

25. The computer readable medium of claim 24, wherein performing the mixing operation on two or more of the m matrix columns comprises performing the mixing operation on all of the m matrix columns.

* * * * *